United States Patent [19]

Kleinert

[11] 3,769,030

[45] Oct. 30, 1973

[54] PROCESS FOR THE FABRICATION OF CHOCOLATE, ESPECIALLY MILK CHOCOLATE

[75] Inventor: Jurg Kleinert, Zurich, Switzerland

[73] Assignee: Chocoladefabriken Lindt & Sprungli Aktiengesellschaft, Kilchberg, Switzerland

[22] Filed: Dec. 22, 1970

[21] Appl. No.: 100,803

[30] Foreign Application Priority Data

Dec. 23, 1969 Switzerland................... 19164/69

[52] U.S. Cl.............................. 426/45, 99/26
[51] Int. Cl.............................. A23g 1/00
[58] Field of Search................... 99/23, 26

[56] References Cited
UNITED STATES PATENTS

| | | | |
|---|---|---|---|
| 1,624,154 | 4/1927 | Winckel | 99/23 |
| 2,863,772 | 12/1958 | Kempf | 99/23 |
| 3,027,257 | 3/1962 | Shenkenberg | 99/26 |
| 2,457,110 | 12/1948 | Burbank et al. | 99/23 |
| 2,487,931 | 11/1949 | Lataner | 99/23 |
| 3,397,061 | 8/1968 | Katz | 99/23 |
| 2,899,309 | 8/1959 | Rusoff | 99/23 |

*Primary Examiner*—Robert L. Lindsay, Jr.
*Assistant Examiner*—Frederick Frei
*Attorney*—Waters, Roditi, Schwartz & Nissen

[57] ABSTRACT

A process for the fabrication of chocolate, especially milk chocolate is disclosed, wherein (a) cocoa is deodorized, (b) a carbohydrate-protein-additive mixture or carbohydrate-protein-additive-cocoa-mixture moistened with a carbohydrate solution is brought into reaction in at least one reactor at a temperature exceeding 50° C in order to form specific flavor and taste substances, the offensive smell and undesired volatile reaction products removed from the reaction mixture, and the reaction mixture is dried. While adding cocoa butter the cocoa treated according to step (a) is admixed with the carbohydrate-protein-additive-mixture or carbohydrate-protein-additive-cocoa-mixture treated according to step (b), plasticized and/or thinned, finely comminuted, and thereafter through the addition of fat and emulsifying agents is imbued or wetted with the fat phase and homogenized in a liquified condition.

9 Claims, No Drawings

PROCESS FOR THE FABRICATION OF CHOCOLATE, ESPECIALLY MILK CHOCOLATE

BACKGROUND OF THE INVENTION

The present invention relates to a new and improved process for the manufacture of chocolate wherein the development of the flavor or aroma is carried-out in a two-stage process, first with the cocoa, then with the carbohydrate-protein-additive-mixture or carbohydrate-protein-additive-cocoa-mixture. Consequently, it is possible to dispense with the conventional techniques for finally refining or finishing the chocolate mass, that is to say, by conching.

During chocolate manufacture the different constituents, such as the cocoa mass, sugar, cocoa butter and fragrance or flavor substances, in the case of milk chocolate additionally the milk constituents, as well as other additives, are intensively admixed with the maximum possible evolvement of the cocoa fragrance or flavor or aroma components, comminuted and homogeneously ground prior to forming the mass into bars.

After the pre-comminution and mixing operations, the chocolate mass is conventionally pre-milled in a so-called three roll-rolling mill, thereafter finely milled or rolled in a five roll-rolling mill. This technique is adequate for conventionally consumed or cooking-chocolate products and the fine milled mass is in condition for forming into single bars.

In the case of easily meltable chocolate, a final finishing operation, designated as conching in the art, was necessary. Conching is a mechanical treatment during which prevail temperatures in the range of 60° to 80° C. During conching there occur both physical and chemical changes in the chocolate mass.

Considered purely physically, the conching operation causes a phase reversal in the chocolate mass since the non-fatty substances are polished and completely encapsulated with a fatty film, resulting in the formation of a continuous fatty phase in the system. There is thus obtained a completely homogeneous mass possessing exceptional flavor and melting characteristics.

The chemical reactions primarily entail oxidation of the tannin remaining after fermentation and roasting of the cocoa beans. Furthermore, due to evaporation of the moisture there are removed volatile vapor components, such as acids, aldehydes and ketones. Additionally, reactions occur between the reducing substances and the amino acids as well as thermally promoted transformations of the sugar substances. The final refinement of the chocolate mass requires very high expenditure of energy and time, also necessitating a great deal of space. Hence, the economies of this production technique are quite disadvantageous. Accordingly, attempts have been made in the art to economize and rationalize the refinement processing of the chocolate melt.

According to a newly developed technique for the manufacture of chocolate, the conching operation is dispensed with because the dried beans after breaking and peeling are ground into a mass, this mass then is heated under pressure in a narrow gap-heat exchanger, thereafter to remove undesired odors it is expanded in a special chamber. This prior art technique is predicated upon the condition that the optimum temperature for the development of the flavor must be in the range of 140° to 160° C, very little flavor developing beneath 140° C while above 160° C the flavor is not very satisfactory. No observations will here be given concerning the taste of the new chocolate produced according to this prior art technique in comparison with the taste of conventional chocolate.

SUMMARY OF THE INVENTION

Accordingly, there is still existant in the art a real need for a rational and economical production technique for chocolate, which, while avoiding the expensive and time consuming conching operation, produces high-quality, good tasting chocolate. Therefore, a primary objective of the instant invention is to provide an improved process for the manufacture of chocolate which reliably and effectively fulfills the need existing in the art.

Still a further significant object of the present invention relates to an improved process for the manufacture of chocolate, especially milk chocolate, dispensing with conching and providing a chocolate product which is of high-quality, yet economical to manufacture, requiring a minimum of treatment time.

Another object of this invention relates to chocolate manufacturing techniques without conching, capable of manufacturing chocolate in a relatively simple, more rational and economical manner while still providing high-quality chocolate products.

DETAILED DESCRIPTION OF THE INVENTION

Now, to implement these and still further objects of the invention, which will become more readily apparent as the description proceeds, the inventive process for the fabrication of chocolate, especially milk chocolate, likewise dispenses with refinement of the chocolate by conching and is, generally speaking, manifested by the features that:

a. the cocoa is deodorized;

b. a carbohydrate-protein-additive-mixture or carbohydrate-protein-additive-cocoa-mixture moistened with a carbohydrate solution is brought to reaction in at least one reactor at a temperature exceeding 50° C for the purpose of forming specific flavor and taste substances, the offensive smell and/or undesired volatile reaction products are removed from the reaction mixture, the reaction mixture dried; and c. the cocoa treated in accordance with step (a) is admixed with the carbohydrate-protein-additive-mixture or carbohydrate-protein-additive-cocoa-mixture treated according to step (b) while adding cocoa butter, this admixture is plasticized or liquified, finely comminuted, and thereafter imbued and homogenized in a liquidous condition while adding fat and emulsifiers.

It is preferable to deodorize the cocoa according to step (a) in such a manner that this cocoa is impregnated with a carbohydrate- and/or protein- and/or enzyme solution, and for the purpose of loosening the resultant structure and for forming the flavor- and taste substances is subjected to a chemical-physical and/or microbiological and/or enzymatic treatment, the undesired, offensive smell or volatile reaction products removed, and the reaction mixture dried. In this regard, the chemical-physical treatment of the impregnated cocoa is advantageously carried-out at a temperature of at least 50° C preferably greater than 100° C, and in particular above 115° C, and at an atmospheric pressure of up to 20 gauge pressure in atmospheres. The chemical-physical treatment of the impregnated cocoa, if desired, should be undertaken subsequent to treatment with a buffer solution, after removing the air in a vapor atmosphere, and the subsequent drying of the reaction mixture deodorized according to the inventive process can occur by infra-red radiation.

It is advisable for enzymatic treatment that the cocoa mass produced from the deodorized cocoa, for the purpose of destroying the enzymes, as well as sterilization, be heated while continuously passing through a narrow gap heat exchanger to at least 120° C while excluding air.

The reaction according to step (b) proceeds in conventional fashion at a temperature exceeding 100° C, preferably greater than 110° C. The proportion of protein of the carbohydrate-protein-additive-mixture can be at least partially derived from cocoa or cocoa products, preferably are present in an amount of 1 to 20 percent by weight of the mixture. The expression "cocoa and/or cocoa products" as used in the context of this application is intended to denote all types of useable cocoa containing-starting materials, especially cocoa powder.

The additive used in the mixture of step (b) can be an inorganic or an organic salt, for instance magnesium carbonate, sodium chloride, ammonium carbonate and calcium phosphate, or an enzyme or mixture of enzymes. Instead of using one additive there can also be present a mixture of additives. In addition to the above mentioned substances, there also belong in this classification, for instance, natural or synthetic flavors or flavoring agents, spices, nutrient or cooking salts, emulsifying agents and amino acids. During the preparation of the carbohydrate-protein-additive-mixture both solid as well as liquid components may be used. The type of protein depends upon the type of chocolate which is to be made. In the case of milk chocolate, there is particularly added cream, full-cream milk, skim milk or whey in liquid or solid form. Advantageously, the portion which is in solution is sprayed on to the solid portion of the carbohydrate-protein-additive-mixture or carbohydrate-protein-additive-cocoa-mixture while continuously stirring or mixing. The homogeneously imbued mixture can then be brought to reaction in a thermal reactor by either a batch or continuous process and the volatile vapor components can be removed. The flavor formation can be controlled by temperature, time and layer thickness.

Depending upon the conditions which are used the formation of the flavor is based upon chemical reactions, either a Maillard reaction or caramelization. Both reactions are based upon the pronounced reduction capability of the mono-saccharide.

In contrast to caramelization, the Maillard reaction is dependent upon specific ingredients, the presence of glucose or fructose (fruit sugars), as well as free amino groups formed from proteins or amino acids. The reaction products resulting from the Maillard reaction, the so-called melanoids, are not only typical taste forming agents, but also pronounced coloring agents.

On the other hand, caramelization is independent of specific ingredients and primarily is based upon thermally dependent transformations of sugar substances. It is characterized by the formation of a number of generally brown to dark brown polymer dyes or coloring agents as well as aromatic compounds.

In the Maillard reaction, the formation of the flavor and coloring agents is decisively dependent upon the reaction conditions, such as temperature, moisture, pH-value, sugar materials, as well as protein compounds and amino acids. It is for these reasons that the flavor and taste components can be varied within wide limits with the inventive process.

During the impregnation of the cocoa with a carbohydrate solution it is recommended to use for steps (a) and (b) the same carbohydrate solution. Furthermore, the reaction mixture obtained during step (b) can subsequently be dried by infra-red radiation.

The reaction mixture of the deodorized cocoa obtained from treatment step (a) and the carbohydrate-protein-additive-mixture or carbohydrate-protein-additive-cocoa-mixture, obtained from treatment step (b), is treated with cocoa butter which is essentially free of odor and taste in a batch or continuous mixer to form a homogeneous and plastic, that is, millable or rollable basic chocolate mass.

The components processed into a homogeneous basic chocolate mass in the ingredient mixing stage are precomminuted and finely comminuted in a two-stage process in a roller mill. The size of the granules of the solid particles in the basic chocolate mass, after the fine grinding operation, should not exceed a microscopic image of $25\mu$ (microns).

Following the fine milling operation, the basic chocolate mass is imbued and homogenized in a liquidous condition with an emulsifying agent- fat-mixture, especially an emulsifier-cocoa butter-mixture, in a special machine. The finished chocolate mass is thereafter precrystallized (tempered) in a manner conventional in the art, formed and packaged into chocolate bars consisting of individual squares or other small size chocolate products.

In contrast to the conventional techniques, the final refining step of the inventive technique only serves to imbue the non-fatty substances with the fat to achieve a homogeneous chocolate mass possessing good melting properties.

The invention will be more fully explained hereinafter in conjunction with a number of specific examples:

EXAMPLE I

To manufacture milk chocolate, the roasted cocoa nibs freed of the cocoa shell are introduced into a so-called cocoa nib reactor, then while continuously stirring are homogeneously wetted or impregnated with a fructose solution, and in a flowing water vapor stream is brought to reaction at 100° C and deodorized. Thereafter, in a continuous process, the moisture is removed to a residual moisture content beneath 2 percent, and thereafter in a two-stage operation processed into a cocoa mass. In order to eliminate the enzymes and for purposes of sterilization, this cocoa mass is then briefly heated to above 120° C during continuous passage through a narrow gap heat exchanger, and until it is further processed then stored in a tank having a heating jacket.

The components necessary for forming the carbohydrate-protein-additive-mixture are added into a mixture in the form of sucrose or saccharose, full-cream milk powder and skim milk powder, cooking salt, vanilla and cardamom and processed into a homogeneous friable mixture. This mixture is uniformly impregnated, while continuously stirred, with the same fructose solution used for impregnating the cocoa nibs, thereafter in a uniform flow is fed in fine agglomerated condition into a flavor reactor, where at a temperature of 108° C it is brought to reaction and to a residual moisture content of beneath 1.5 percent, and then is introduced into a dry bunker.

The deodorized cocoa mass and the obtained carbohydrate-protein-additive-mixture are processed into a homogeneous mass, which while continuously mixing is plasticized into a rollable or millable mass while adding cocoa butter, then finely comminuted by rolling and imbued or wetted with the fat phase. Thereafter the finely comminuted and imbued basic chocolate mass is liquified by the addition of an emulsifying cocoa butter and formed into chocolate bars.

EXAMPLE II

For the manufacture of dark chocolate, there is again carried-out the first stage of the operation for deodorizing the cocoa in the same manner as described in conjunction with Example I. In the second stage, cocoa is additionally added to the carbohydrate-protein-additive-mixture in the mixer and the mixture is then processed in the manner described in Example I. The production of the chocolate from the deodorized cocoa mass and the prepared carbohydrate-protein-additive-cocoa-mixture likewise is performed in the manner described in conjunction with Example I.

EXAMPLE III

In order to carry-out an enzymatic treatment, the cocoa nib mixture is homogeneously impregnated in a mixer with a reaction solution containing up to 15 percent by weight glucose, 5 percent by weight magnesium carbonate, 1 percent by weight of a lipase-amylase-proteaseenzyme solution and 79 percent by weight water. After 50 minutes acitivity at 40° C the mixture is dried in a continuous through-passage dryer to a residual moisture content beneath 1.5 percent and processed together with the treated carbohydrate-protein-additive-mixture into chocolate.

By way of completeness it is here mentioned that the upper temperature limit for the process steps (a) and (b) amounts to approximately 150° C. Suitable examples of the buffer materials which may be used in the practice of the invention are, sodium titrate buffer, phosphate buffer, acetic acid. Apart from cocoa butter, there may also be used as the fat peanut fat, coberine fat, calvetta fat and illaxao fat. Also, it is here mentioned that as the emulsifying agents or emulsifiers there can be used e.g., lecithin or glycerine monostearate. Suitable further examples of the carbohydrate or carbohydrate solution, apart from fructose, are saccharose, galoctose, and glucose, for instance.

While there is described present preferred embodiments of the invention, it is to be distinctly understood that the invention is not limited thereto but may be otherwise variously embodied and practiced within the scope of the following claims.

What is claimed is:

1. A method for the manufacture of chocolate paste, especially milk chocolate paste, wherein cocoa is deodorized and a paste obtained from the deodorized cocoa is finished without conching, the method comprising the following steps:

1. impregnating broken, shell-free, roasted cocoa kernel with an aqueous solution of mono- or disaccharides which may further contain amylolytic and proteolytic enzymes, heating the mixture, after having been stored at 40° C if enzymes are present, to a temperature of at least 50° C. to about 150° C. in order to develop flavoring substances, then treating the heated mixture with a water vapor stream to eliminate bad smelling compounds, and finally drying the water vapor treated mixture after destruction by sterilization of any enzymes present;
    2. impregnating a second mixture comprising
        a. mono- or disaccharides,
        b. protein-containing edible components and
        c. at least one food additive selected from the group consisting of flavoring agents, spices, salts, emulsifiers and amino acids,
    with an aqueous solution defined under (1) above, heating said impregnated second mixture in a reactor at a temperature exceeding 100° C. to about 150° C. and drying said heated impregnated second mixture; and
    3. mixing together the mixtures obtained in steps (1) and (2) with the addition of cocoa butter to form a final mixture, plasticizing said final mixture, and liquefying and wetting said plasticized final mixture by the addition of an edible emulsifier and a vegetable fat.

2. The method of claim 1, wherein the same impregnating solution is used in steps (1) and (2).

3. A method as claimed in claim 1, wherein the drying in step (1) is effected by infra-red radiation.

4. A method as claimed in claim 1, wherein the heat treatment in step (1) of cocoa impregnated with an enzyme-free monosaccharide or disaccharide solution is effected at a pressure in the range from atmospheric pressure up to 20 atmospheres gauge.

5. A method as claimed in claim 1, wherein the heat treatment in step (1) of cocoa impregnated with an enzyme-free monosaccharide or disaccharide solution occurs, after removing the air, in a water vapor atmosphere.

6. A method as claimed in claim 1, wherein the sterilization in step (1) is effected by continuously passing the water vapor treated mixture at a temperature of at least 120° C through a heat exchanger of the narrow gap type while excluding air.

7. A method as claimed in claim 1, wherein the heat treatment of step (2) is effected at a temperature exceeding exceeding 110° C.

8. A method as claimed in claim 1, wherein the heat treatment in step (1) of cocoa impregnated with an enzyme-free monosaccharide solution is effected at a temperature of at least 100° C.

9. A method as claimed in claim 8 wherein the temperature in step (1) is greater than 115° C.

* * * * *